United States Patent Office 3,073,786
Patented Jan. 15, 1963

3,073,786
POLYEPOXIDE RESIN COMPOSITIONS
William M. Kraft, Verona, and Joseph Weisfeld, Orange, N.J., assignors to Heyden Newport Chemical Corporation, New York, N.Y., a corporation of Delaware
No Drawing. Filed Nov. 14, 1960, Ser. No. 68,691
20 Claims. (Cl. 260—2)

This invention relates to novel polyepoxide resin compositions. It further relates to cured resinous compositions and to the process by which they are produced. Specifically the invention relates to compositions comprising a polyepoxide resin and allo-ocimene dioxide and to cured resins derived from these compositions.

Polyepoxide resins have a combination of chemical and physical properties that make them valuable in a number of industrial applications. For example, they may be employed in durable surface coating compositions, in high-strength adhesives, and in a variety of laminated products. They are of particular value as potting and casting materials since they combine excellent electrical and mechanical properties with low shrinkage during the curing step.

Because most of the epoxide resins are either solids or viscous liquids at room temperature, they are not readily blended with the other ingredients of the resinous compositions, and they often form viscous compositions that have poor penetration, flow, and wetting properties. In the past the fluidity of the epoxide resins has been improved by heating them and thereby reducing their viscosity or by diluting them with a suitable solvent. Among the solvents that have been used for this purpose are both volatile solvents which evaporate from the composition before or during the curing step, such as acetone, ethyl acetate, chloroform, benzene, xylene, and the like, and non-volatile solvents which remain in the cured composition, such as dibutyl phthalate or acetonitrile. In addition reactive diluents, for example, styrene oxide or phenyl glycidyl ether, have been used. These procedures for the reduction of the viscosity of polyepoxide resin composition have often proven unsatisfactory since they may be difficult and/or expensive to carry out and since they may form products having relatively poor adhesion and other physical properties.

It has now been found that allo-ocimene dioxide can be combined with polyepoxide resins to form products that are substantially lower in viscosity and far superior in handling properties to the unmodified resins. The allo-ocimene dioxide modified polyepoxide resin compositions, which are characterized by excellent penetration, flow, and wetting properties and by the ability to tolerate sizable amounts of fillers, may be cured to form resins that are in many ways superior to those prepared from the unmodified polyepoxide resin. In particular allo-ocimene dioxide modified polyepoxide resins have better electrical properties, greater resistance to mechanical impact or shock, and better flexibility than do the unmodified resins.

The allo-ocimene dioxide which is used to modify polyepoxide resin may be prepared by any convenient procedure. It may, for example, be prepared by the thermal depolymerization of polymeric allo-ocimene peroxide. This preparation has been carried out as follows: One hundred grams of freshly distilled allo-ocimene was allowed to stand in a loosely-covered vessel at room temperature for 4 days. The resulting oxidized material, which weighed 116 grams, was dissolved in 100 ml. of diethyl ether. The ether solution was mixed with 500 ml. of ethanol to precipitate a white flocculent material which was then collected, washed with three 100 ml. portions of ethanol, and dried. The resulting polymeric allo-ocimene peroxide, which weighed 21.2 grams, was heated gradually to 65° C. at which point an exothermic reaction occurred which caused the temperature to rise to 145° C. When cooled to room temperature, the product was a pale yellow, mobile liquid. The crude allo-ocimene dioxide prepared in this way was distilled under reduced pressure. The main fraction, which had the formula $C_{10}H_{16}O_2$, distilled at 85°–87° C./2.5 mm. and had a density at 25° C. of 0.9492 and a refractive index at 25° C. of 1.4640. The exact composition of the product is not known. The data available at the present time indicate that the product is a mixture of allo-ocimene dioxides which contains a substantial amount of 2,7-peroxy-2,6-dimethyloctadiene-3,5. Either crude allo-ocimene dioxide or the distilled material may be used in the practice of the present invention.

The amount of allo-ocimene dioxide used in the novel compositions is that amount which will reduce the viscosity of the resin to the desired level without unduly affecting its other physical and chemical properties. The amount used in each case depends upon such factors as the nature of the polyepoxide resin and its molecular weight and the properties desired in the cured resin. Generally at least 5 parts by weight of allo-ocimene dioxide must be present for each 100 parts by weight of the polyepoxide resin in order to obtain a composition having satisfactory fluidity. When a relatively soft, flexible product is desired, 50 to 80 parts by weight or more of the dioxide per 100 parts of the resin may be used. For most applications 10 to 50 parts by weight and preferably 10 to 20 parts by weight of allo-ocimene dioxide is used per 100 parts by weight of the polyepoxide resin.

A wide variety of polyepoxide resins may be used in the practice of the present invention. The useful polyepoxide resins are those having at least one epoxy

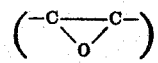

group in the 1,2-position of the molecule. They may be saturated or unsaturated, aliphatic, cycloaliphatic, aromatic, or heterocyclic. They may be substituted with chlorine atoms, hydroxyl groups, amino groups, and the like. They may be monomeric or polymeric materials.

The preferred polyepoxide resins are polyethers resulting from the condensation of a halogen-containing epoxide, such as epichlorohydrin or dichlorohydrin, with a polyhydric alcohol or a polyhydric phenol. The polyethers of polyhydric phenols may, for example, be prepared by reacting a phenolic compound with epichlorohydrin at a temperature between approximately 50° C. and 150° C. in an alkaline medium. Among the polyhydric phenols that may be used for this purpose are resorcinol, catechol, phloroglucinol, and hydroquinone as well as the polynuclear phenols, such as 2,2-bis (4-hydroxyphenyl) propane, 2,2-bis (4-hydroxyphenyl)-butane, 4,4'-dihydroxybendophenone, 4,4'-dihydroxy biphenyl, and 1,5-dihydroxynaphthalene.

The polyethers of polyhydric alcohols may be prepared by reacting a polyhydric alcohol with epichlorohydrin in the presence of an acidic material, such as boron trifluoride, and subsequently treating the resulting product with an alkaline material. Included among the polyhydric alcohols that may be used in the preparation of these polyepoxide resins are the following: glycerine, ethylene glycol, propylene glycol, diethylene glycol, hexanetriol, sorbitol, pentaerythritol, inositol, trimethylolethane, trimethylolpropane, 1,4-dimethylolbenzene, dimethyloltoluenes and the like. In addition polyhydric ether alcohols, such as diglycerol, dipentaerythritol, tripentaerythritol, dimethylolanisoles, and polyhydroxyalkyl ethers of the aforementioned polyhydric alcohols may be used. Esters, hydroxyaldehydes, hydroxyketones, and halogenated compounds derived from these polyhydric alcohols are also useful in the preparation of the polyethers.

Other polyepoxides which may be used in the practice of the invention include epoxidized triglycerides, such as epoxidized glycerol trilinoleate; 1,4-bis (2,3-epoxypropoxy) benzene; 1,8-bis (2,3-epoxypropoxy) octane; 1,4-bis (2,3-epoxypropoxy) cyclohexane; 1,4-bis (3,4-epoxybutoxy)-2-chlorocyclohexane; 1,3-bis (2-hydroxy-3,4-epoxybutoxy) benzene; 4,4'-bis (2,3-epoxypropoxy) diphenyl ether; and epoxidized phenol-formaldehyde resins. To be useful in the present invention the polyepoxide resin should have a 1,2-epoxy equivalency of at least 1; that is, it should contain an average of at least one 1,2-epoxy group per molecule of the resin. For most purposes the 1,2-epoxy equivalency should fall between 1.1 and 3.0; the preferred 1,2-epoxy equivalency is generally between 1.2 and 2.0.

The properties of the polyepoxide resins of the types described vary within wide limits ranging from those which are liquid at room temperature and which have relatively low molecular weights to those which melt at temperatures above 150° C. and which have relatively high molecular weights. In the preparation of the novel compositions we prefer to use resins which melt at temperatures below approximately 140° C. We particularly prefer to use resins that are liquid at room temperature or that are low-melting solids. Such resins usually have molecular weights in the range of 250 to 1000 and preferably in the range of 350 to 600. If desired, however, resins having higher melting points and higher molecular weights may be combined with allo-ocimene dioxide to form compositions having improved physical properties.

The allo-ocimene dioxide modified polyepoxide resin compositions may be converted to the substantially thermoset stage through the use of any of the known curing agents. These include, for example, primary, secondary, and tertiary amines, quaternary ammonium compounds, and organic polycarboxylic acids and their anhydrides. Illustrative of the amine curing agents are the following: ethylene diamine, diethylene triamine, diethylamino propylamine, m-phenylene diamine, piperidine, menthane diamine, amine-ethylene oxide adducts, benzyldimethylamine, dimethylaminomethylphenol, tridimethylaminomethylphenol and its triacetate, tribenzoate, and tri-2-ethylhexoate salts, diaminodiphenyl sulphone, dicyandiamide, and benzyltrimethyl ammonium hydroxide. Also useful are amine-terminated polyamides, such as those based on soybean oil fatty acids and aliphatic polyamines. The amine curing agents are used in the amount of 5 to 30 and preferably 10 to 20 parts by weight per 100 parts of the polyepoxide resin.

The anhydride curing agents may be derived from saturated or unsaturated aliphatic, cycloaliphatic, aromatic, or heterocyclic polycarboxylic acids. Examples of these anhydrides include phthalic anhydride, isophthalic anhydride hexachloroendomethylenetetrahydrophthalic anhydride, tetrachlorophthalic anhydride, maleic anhydride, chloromaleic anhydride, succinic anhydride, chlorosuccinic anhydride, dodecylsuccinic acid anhydride, pyromellitic anhydride, polyadipic acid anhydride, and the like and mixtures thereof. The preferred anhydrides are the normally liquid or low melting anhydrides, for example, hexahydrophthalic anhydride. Of particular value are dimethyl butenyl tetrahydrophthalic anhydride and its hydrogenated derivative, dimethyl butyl hexahydrophthalic anhydride, whose preparation and use as curing agents for polyepoxide resins are described in copending application Serial No. 766,189, which was filed on October 7, 1958. The amount of anhydride that is required to cure the polyepoxide resin ranges from approximately 0.6 to 1.5 equivalents for each equivalent of epoxide in the polyepoxide resin. The preferred amount is approximately 0.8 to 1.3 equivalents for each equivalent of epoxide in the polyepoxide.

The allo-ocimene dioxide may be combined in any convenient manner with the polyepoxide resin and other ingredients if any of the novel compositions. For example, all of the ingredients may simply be mixed together prior to the curing step. We prefer to prepare the compositions by first mixing the allo-ocimene dioxide with the polyepoxide resin and then incorporating the curing agent into this mixture.

When an anhydride is used as the curing agent, a small amount of a tertiary amine, such as N,N-dimethyl-benzyl amine, may be added to the polyepoxide resin-allo-ocimene dioxide-curing agent composition to accelerate the curing reaction and to allow it to be carried out at a somewhat lower temperature. Approximately 0.1% to 5% by weight based on the weight of the composition and preferably 0.5% to 1.0% by weight of the amine may be used for this purpose.

If desired other ingredients may be added to the novel compositions before they are cured. These include fillers, pigments, dyes, plasticizers, and the like in the amounts ordinarily employed for such purposes. Combinations of the compositions of this invention with other resins, such as alkyd resins, urea resins, and phenolic resins, may be cured readily to form useful products.

The curing of the polyepoxide resin-allo-ocimene dioxide compositions which contain anhydride curing agents may be effected by heating them at a suitable temperature until solid products are obtained. Excellent rates of cure are obtained at temperatures between approximately 80° C. and 200° C. Compositions containing amine curing agents may be cured by allowing them to stand at room temperature until solid products are obtained or by heating them at a suitable temperature. The preferred curing cycle for amine-cured resins consists of a curing period at room temperature followed by a short heating period.

The invention is illustrated by the examples that follow. It is to be understood, however, that the examples are given merely for the purpose of illustration and that the invention is not to be construed as being limited to any of the specific materials or conditions cited therein.

EXAMPLE 1

To demonstrate the reduction in viscosity that occurs when allo-ocimene dioxide is added to a polyepoxide resin, a series of mixtures of these materials was prepared. The polyepoxide resin that was used was prepared by the reaction of 2,2-bis (4-hydroxyphenyl) propane with epichlorohydrin in an alkaline medium. It had an equivalent weight of 185–205 and a molecular weight of about 390. The viscosities of the mixtures are given in Table I.

*Table I*

| Polyepoxide Resin (Grams) | Allo-ocimene Dioxide (Grams) | Gardner-Holdt Viscosity at 25° C. |
|---|---|---|
| 100 | 0 | $Z_4$-$Z_5$ |
| 100 | 10 | $Z_1$ |
| 100 | 20 | Y |
| 100 | 50 | N |

EXAMPLE 2

To the mixtures described in Example 1 were added varying amounts of an anhydride curing agent, dimethyl butenyl tetrahydrophthalic anhydride. The viscosities of the resulting compositions are given in Table II.

Table II

| Composition | Polyepoxide Resin (Grams) | Allo-Ocimene Dioxide (Grams) | Dimethyl butenyl tetrahydrophthalic anhydride (Grams) | Gardner-Holdt Viscosity at 25° C. |
|---|---|---|---|---|
| A | 100 | 0 | 119 | Y–Z |
| B | 100 | 10 | 133 | W |
| C | 100 | 20 | 147 | T |
| D | 100 | 50 | 189 | H–I |

EXAMPLE 3

To each of the compositions described in Example 2 was added as accelerator 1% by weight of N,N-dimethylbenzyl amine. The compositions were poured into molds and cured at 120° C. for 16 hours and then at 180° C. for 1 hour. Heat distortion temperatures of the cured resins were determined by ASTM Method D–648. The weight loss of the resins on curing and their heat distortion temperatures are given in Table III.

Table III

| Composition | Heat Distrotion Temperature (° C.) | Weight Loss on Curing, percent |
|---|---|---|
| A | 127 | (¹) |
| B | 116 | 0.81 |
| C | 109 | 0.85 |
| D | 94 | 1.15 |

¹ Negligible.

EXAMPLE 4

A series of polyepoxide-allo-ocimene dioxide-diethylene triamine compositions was prepared to demonstrate the use of allo-ocimene dioxide in amine-cured polyepoxide resins. The polyepoxide resin used was the same as that used in Example 1. The compositions were cured at room temperature for 16 hours and then at 150° C. for 1 hour. The weight loss of each of the compositions during the cure was less than 1%. The viscosity of the systems before curing and the heat distortion temperatures of the cured resins are given in table IV.

Table IV

| Polyepoxide Resin (Grams) | Allo-Ocimene Dioxide (Grams) | Diethylene Triamine (Grams) | Gardner-Holdt Viscosity at 25° C. | Heat Distortion Temperature (° C.) |
|---|---|---|---|---|
| 100 | 0 | 10 | Y–Z | |
| 100 | 0 | 15 | | 120 |
| 100 | 10 | 10 | U–V | |
| 100 | 10 | 15 | S | 90 |
| 100 | 20 | 15 | Q | 61 |
| 100 | 50 | 15 | | (¹) |

¹ Approaches flexibility.

Resins having approximately the same heat distortion temperatures as those given in Table IV were obtained when the compositions described in Example 4 were cured at room temperature.

Each of the resins whose preparation was described in Examples 3 and 4 was found to have excellent electrical and mechanical properties.

We claim:

1. A composition comprising a polyepoxide resin having a 1,2-epoxy equivalency greater than 1 and from 5 to 80 parts by weight per 100 parts by weight of said polyepoxide resin of allo-ocimene dioxide.

2. A composition comprising a polyepoxide resin having a 1,2-epoxy equivalency between 1.1 and 3.0 and a molecular weight between 250 and 1000 and from 10 to 50 parts by weight per 100 parts by weight of said polyepoxide resin of allo-ocimene dioxide.

3. A composition comprising a polyepoxide resin having a 1,2-epoxy equivalency between 1.2 and 2.0 and a molecular weight between 350 and 600 and from 10 to 20 parts by weight per 100 parts by weight of said polyepoxide resin of allo-ocimene dioxide.

4. The composition of claim 3 wherein the polyepoxide resin is the product of the condensation of epichlorohydrin with a polyhydric compound selected from the group consisting of polyhydric alcohols and polyhydric phenols.

5. A composition comprising a polyepoxide resin having a 1,2-epoxy equivalency between 1.1 and 3.0 and a molecular weight between 250 and 1000, allo-ocimene dioxide, and a curing agent said allo-ocimene being present in the amount of 10 to 50 parts by weight per 100 parts by weight of said polyepoxide resin.

6. A composition comprising a polyepoxide resin having a 1,2-epoxy equivalency between 1.1 and 3.0 and a molecular weight between 250 and 1000, allo-ocimene dioxide, and a polycarboxylic acid anhydride curing agent, said allo-ocimene being present in the amount of 10 to 50 parts by weight per 100 parts by weight of said polyepoxide resin and said anhydride curing agent being present in the amount of 0.6 to 1.5 equivalents per equivalent of epoxide in said polyepoxide resin.

7. A composition comprising a polyepoxide resin having a 1,2-epoxy equivalency between 1.2 and 2.0 and a molecular weight between 350 and 600, said polyepoxide resin being the product of the condensation of epichlorohydrin and a polyhydric compound selected from the group consisting of polyhydric phenols and polyhydric alcohols, allo-ocimene dioxide, and a polycarboxylic acid anhydride curing agent, said allo-ocimene dioxide being present in the amount of 10 to 20 parts by weight per 100 parts by weight of said polyepoxide resin and said anhydride curing agent being present in the amount of 0.8 to 1.3 equivalents per equivalent of epoxide in said polyepoxide resin.

8. The composition of claim 7 wherein the anhydride curing agent is dimethyl butenyl tetrahydrophthalic anhydride.

9. A composition comprising a polyepoxide resin having a 1,2-epoxy equivalency between 1.1 and 3.0 and a molecular weight between 250 and 1000, said polyepoxide resin being the product of the condensation of epichlorohydrin with a polyhydric compound selected from the group consisting of polyhydric alcohols and polyhydric phenols, allo-ocimene dioxide, and an amine curing agent, said allo-ocimene dioxide being present in the amount of 10 to 50 parts by weight per 100 parts by weight of said polyepoxide resin and said amine curing agent being present in the amount of 5 to 30 parts by weight per 100 parts by weight of said polyepoxide resin.

10. The composition of claim 9 wherein the amine curing agent is diethylene triamine.

11. A resinous composition obtained by forming a mixture of a polyepoxide resin having a 1,2-epoxy equivalency greater than 1, allo-ocimene dioxide, and a curing agent, said allo-ocimene dioxide being present in the amount of 5 to 80 parts by weight per 100 parts by weight of said polyepoxide resin and said curing agent being a member of the group consisting of polycarboxylic acid anhydrides in the amount of 0.6 to 1.5 equivalents per equivalent of epoxide in said polyepoxide resin, amines in the amount of 5 to 30 parts by weight per 100 parts by weight of said polyepoxide resin, and mixtures thereof, and thereafter curing said mixture so as to form a resinous composition.

12. A resinous composition obtained by forming a mixture of a polyepoxide resin having a 1,2-epoxy equivalency between 1.1 and 3.0 and a molecular weight between 250 and 1000, said polyepoxide resin being the product of the condensation of epichlorohydrin and a polyhydric compound selected from the group consisting of polyhydric alcohols and polyhydric phenols, allo-ocimene dioxide, and a curing agent, said allo-ocimene dioxide being present in the amount of 10 to 50 parts by weight per 100 parts by weight of said polyepoxide resin and said curing agent being a member of the group consisting of polycarboxylic acid anhydrides in the amount of 0.6 to 1.5 equivalents per equivalent of epoxide in said polyepoxide resin, amines in the amount of 5 to 30 parts by weight per 100 parts by weight of said polyepoxide resin and mixtures thereof and thereafter curing said mixture so as to form a resinous composition.

13. A resinous composition obtained by forming a mixture of a polyepoxide resin having a 1,2-epoxy equivalency between 1.2 and 2.0 and a molecular weight between 350 and 600, said polyepoxide being the product of the condensation of epichlorohydrin with a polyhydric compound selected from the group consisting of polyhydric phenols and polyhydric alcohols, allo-ocimene dioxide, and a polycarboxylic acid anhydride curing agent, said allo-ocimene dioxide being present in the amount of 10 to 20 parts by weight per 100 parts of said polyepoxide resin and said anhydride curing agent being present in the amount of 0.8 to 1.3 equivalents per equivalent of epoxide in said polyepoxide resin, and thereafter heating said mixture at a temperature between approximately 80° C. and 200° C. so as to form a resinous composition.

14. The composition of claim 13 wherein the polycarboxylic acid anhydride curing agent is dimethyl butenyl tetrahydrophthalic anhydride.

15. A resinous composition obtained by forming a mixture of a polyepoxide resin having a 1,2-epoxy equivalency between 1.2 and 2.0 and a molecular weight between 350 and 600, said polyepoxide resin being the product of the condensation of epichlorohydrin with a polyhydric compound selected from the group consisting of polyhydric phenols and polyhydric alcohols, allo-ocimene dioxide, and an amine curing agent, said allo-ocimene dioxide being present in the amount of 10 to 20 parts by weight per 100 parts by weight of said polyepoxide resin and said amine curing agent being present in the amount of 10 to 20 parts by weight per 100 parts by weight of said polyepoxide resin, and thereafter curing said mixture to form a resinous composition.

16. The process of producing a resinous product which comprises forming a mixture of a polyepoxide resin having a 1,2-epoxy equivalency greater than 1, allo-ocimene dioxide, and a curing agent, said allo-ocimen dioxide being present in the amount of 5 to 80 parts by weight per 100 parts by weight of said polyepoxide resin and said curing agent being a member of the group consisting of polycarboxylic acid anhydrides in the amount of 0.6 to 1.5 equivalents per equivalent of epoxide in said polyepoxide resin, amines in the amount of 5 to 30 parts by weight per 100 parts of said polyepoxide resin, and mixtures thereof, and thereafter curing said mixture so as to form a resinous product.

17. The process of claim 16 wherein the polyepoxide resin is the product of the condensation of epichlorohydrin and a polyhydric compound selected from the group consisting of polyhydric phenols and polyhydric alcohols, said polyepoxide resin having a 1,2-epoxy equivalency between 1.1 and 3.0 and a molecular weight between 250 and 1000.

18. The process of producing a resinous product which comprises forming a mixture of a polyepoxide resin having a 1,2-epoxy equivalency between 1.2 and 2.0 and a molecular weight between 350 and 600, said polyepoxide resin being the product of the condensation of epichlorohydrin with a polyhydric compound selected from the group consisting of polyhydric phenols and polyhydric alcohols, allo-ocimene dioxide, and a polycarboxylic acid anhydride curing agent, said allo-ocimene dioxide being present in the amount of 10 to 20 parts by weight per 100 parts of said polyepoxide resin and said anhydride curing agent being present in the amount of 0.8 to 1.3 equivalents per equivalent of epoxide in said polyepoxide resin, and thereafter heating said mixture at a temperature between approximately 80° C. and 200° C. so as to form a resinous product.

19. The process of producing a resinous product which comprises forming a mixture of a polyepoxide resin having a 1,2-epoxy equivalency of at least 1 and from 5 to 80 parts by weight per 100 parts by weight of said polyepoxide resin of allo-ocimene dioxide, adding to said mixture a polycarboxylic acid anhydride curing agent in the amount of 0.6 to 1.5 equivalents per equivalent of epoxide in said polyepoxide resin, and thereafter heating the mixture at a temperature between approximately 80° C. and 200° C. so as to form a resinous product.

20. The process of producing a resinous product which comprises forming a mixture of a polyepoxide resin having a 1,2-epoxy equivalency between 1.2 and 2.0 and a molecular weight between 350 and 600, said polyepoxide resin being the product of the condensation of epichlorohydrin with a polyhydric compound selected from the group consisting of polyhydric phenols and polyhydric alcohols, allo-ocimene dioxide, and an amine curing agent, said allo-ocimene dioxide being present in the amount of 10 to 20 parts by weight per 100 parts of said polyepoxide resin and said amine curing agent being present in the amount of 10 to 20 parts by weight per 100 parts of said polyepoxide resin, and thereafter curing said mixture so as to form a resinous product.

References Cited in the file of this patent

UNITED STATES PATENTS

| | | |
|---|---|---|
| 2,512,996 | Bixler | June 27, 1950 |
| 2,682,515 | Naps | June 29, 1954 |
| 2,826,556 | Greenspan et al. | Mar. 11, 1958 |
| 2,829,131 | Greenspan et al. | Apr. 1, 1958 |
| 2,914,490 | Wheelock | Nov. 24, 1959 |
| 2,982,572 | Phillips et al. | May 2, 1961 |

OTHER REFERENCES

Naves et al.: "Structure et derives du diepoxyde d'allo-ocimene," Bulletin de la Societe Chimique de France, November-December 1956, pages 1768–1773.